United States Patent
Sobol

(10) Patent No.: US 8,537,224 B2
(45) Date of Patent: Sep. 17, 2013

(54) IMAGE CAPTURE DEVICE HAVING A SHAKE METTER

(75) Inventor: Robert E. Sobol, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1819 days.

(21) Appl. No.: 11/047,958

(22) Filed: Jan. 31, 2005

(65) Prior Publication Data

US 2006/0170781 A1   Aug. 3, 2006

(51) Int. Cl.
*H04N 5/228* (2006.01)
*H04N 5/222* (2006.01)

(52) U.S. Cl.
USPC ............. 348/208.4; 348/333.02; 348/333.04

(58) Field of Classification Search
USPC ............... 348/208.99, 208.2, 208.4, 333.02, 348/333.04; 396/52, 53, 54
See application file for complete search history.

(56) References Cited

U.S. PATENT DOCUMENTS

| | | | | |
|---|---|---|---|---|
| 5,598,242 A | * | 1/1997 | Omi et al. | 396/55 |
| 6,810,207 B2 | * | 10/2004 | Sato et al. | 396/54 |
| 6,930,718 B2 | * | 8/2005 | Parulski et al. | 348/333.11 |
| 7,098,946 B1 | * | 8/2006 | Koseki et al. | 348/229.1 |
| 7,177,538 B2 | * | 2/2007 | Sato et al. | 396/55 |
| 7,333,723 B2 | * | 2/2008 | Sato | 396/55 |
| 7,397,500 B2 | * | 7/2008 | Yost et al. | 348/208.99 |
| 2002/0057461 A1 | * | 5/2002 | Dow et al. | 358/302 |
| 2005/0052538 A1 | * | 3/2005 | Sato et al. | 348/208.1 |
| 2005/0146619 A1 | * | 7/2005 | Kobayashi et al. | 348/208.1 |

FOREIGN PATENT DOCUMENTS

| | | |
|---|---|---|
| JP | 2000180936 | 6/2000 |
| JP | 2004077713 | 3/2004 |

OTHER PUBLICATIONS

Japanese Patent Application No. 2006-021718, Office Action dated May 12, 2009.

* cited by examiner

*Primary Examiner* — Nhan T Tran

(57) ABSTRACT

An electronic image capture device including an image capture array, an optional image stabilization gyro, a processor, and a display is configured to detect the amount shaking of the device either prior to, or during image capture. When the shaking of the device exceeds a threshold required for the capture of quality images, the user of the image capture device is notified through the display that excessive shake has been detected and may be advised on methods to reduce or eliminate the shake.

33 Claims, 3 Drawing Sheets

IMAGE CAPTURE DEVICE HAVING A SHAKE METTER

FIELD OF THE INVENTION

The present invention relates generally to the field of handheld image capture devices, and more particularly to the field of handheld image capture devices susceptible to user shake.

BACKGROUND OF THE INVENTION

Handheld electronic image capture devices such as digital cameras, when used in low light conditions, often require an amount of capture time that approaches, or exceeds, the limited time that a user is capable of holding the device without an appreciable amount of shaking. Many experienced photographers use as a rule of thumb, that if the shutter speed is slower than 1/fl (where fl is the focal length of the lens) in 35 mm cameras, the image capture device should not be handheld, but mechanically supported to reduce or eliminate the shaking. However, many novice photographers are not familiar with this rule of thumb and continue to handhold their electronic image capture devices even in situations where the shutter speed is too long for a handheld capture.

Also, not all users are equally steady. For example, people shivering in the cold are less able to hold an image capture device steady than a professional photographer in warm, calm weather familiar with methods of gripping and using the image capture device to minimize shake. The very young and the very elderly may not have the strength required to hold an image capture device steady through a long exposure, and in fact, may not realize that they are not holding the image capture device steady.

SUMMARY OF THE INVENTION

An electronic image capture device including an image capture array, an optional image stabilization gyro, a processor, and a display is configured to detect the amount shaking of the device either prior to, or during image capture. When the shaking of the device exceeds a threshold required for the capture of quality images, the user of the image capture device is notified through the display that excessive shake has been detected and may be advised on methods to reduce or eliminate the shake.

Other aspects and advantages of the present invention will become apparent from the following detailed description, taken in conjunction with the accompanying drawings, illustrating by way of example the principles of the invention.

DETAILED DESCRIPTION

Figure 1A:
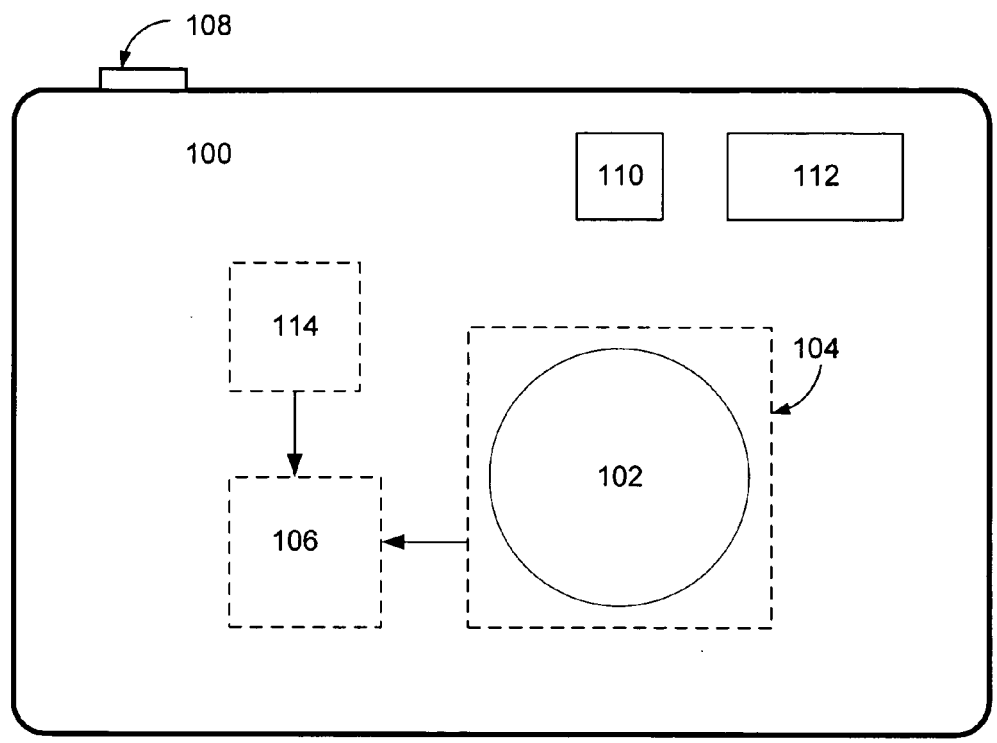
FIG. 1A is a front view of an electronic image capture device configured to meter device shake according to the present invention.

This description of the preferred embodiments is intended to be read in connection with the accompanying drawings, which are to be considered part of the entire written description of this invention. In the description, relative terms such as "lower," "upper," "horizontal," "vertical," "up," "down," "top," "bottom," "left," and "right" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected," "coupled," and "interconnected," refer to a relationship wherein structures are secured or attached to one another either directly or indirectly through intervening structures, as well as both movable or rigid attachments or relationships, unless expressly described otherwise.

FIG. 1A is a front view of an electronic image capture device configured to meter device shake according to the present invention. In the example embodiment of the present invention shown in FIG. 1A, a electronic image capture device body 100 includes a lens 102 configured to project an image onto an image capture array 104, such as a charge-coupled device (CCD), and an processor 106 electrically coupled to the image capture array 104. The body 100 also includes a shutter button 108, an optional viewfinder 110, and an optional flash 112. If the electronic image capture device includes image stabilization, the body 100 may also contain an image stabilization gyro 114. This image stabilization gyro 114 is used to detect motion of the image capture device and is electrically coupled to the processor 106 for use in compensating for the device motion.

Figure 1B:
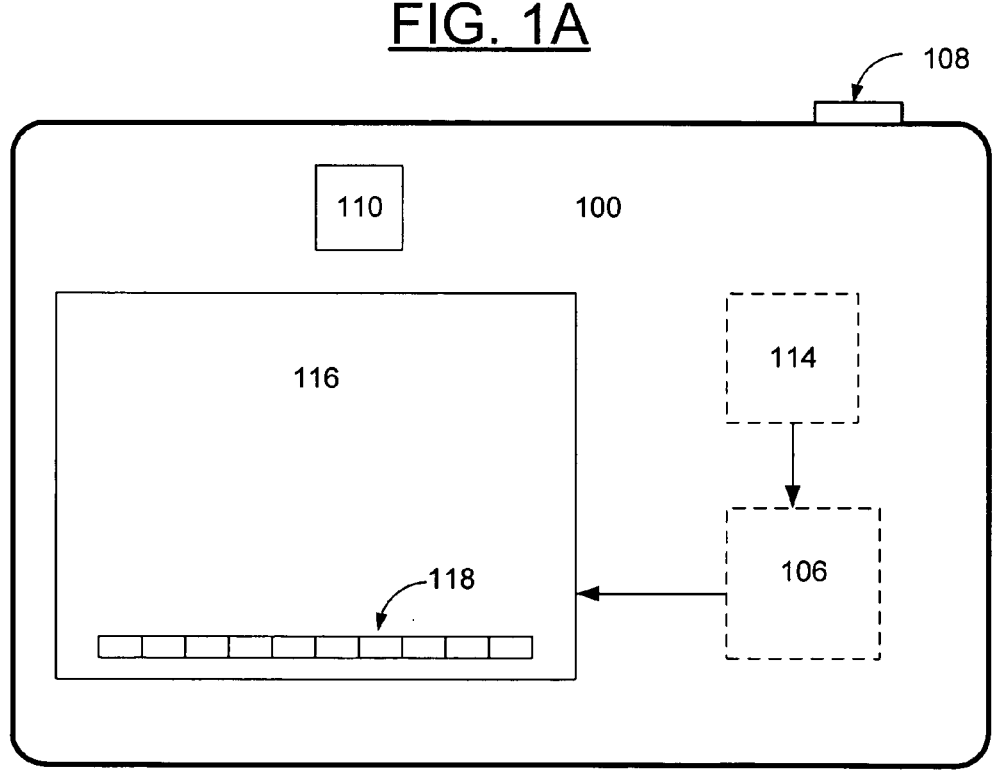
FIG. 1B is a rear view of an electronic image capture device configured to meter device shake according to the present invention from FIG. 1A.

FIG. 1B is a rear view of an electronic image capture device configured to meter device shake according to the present invention from FIG. 1A. In this rear view of the example embodiment of the present invention from FIG. 1A, the electronic image capture device body 100 includes the shutter button 108, and a display 116 electrically coupled to the processor 106. The back side of the optional viewfinder 110 may also be seen in this view. The optional image stabilization gyro 114 is also shown electrically coupled to the processor 106. In this example embodiment of the present invention a bar graph 118 is used to display the amount of shake to a user. Those of skill in the art will recognize that there are a very large number of ways to communicate an amount of shake to a user. For example, a numerical quantity of shake may be displayed, different colors may be used to represent different quantities of shake, or a vector may be displayed representing quantity and direction of shake. The communication to the user of the amount of shake present may be accomplished within the viewfinder 110, within the display 116, or even through other lights, graphs, or displays present on the body 100 of the image capture device.

Some electronic image capture devices include an image stabilization gyroscope (gyro) 114 used to measure device motion, electronically output a quantity of motion and direction of motion to a processor 106 for use by the image capture device in making adjustments to the image capture array 104 or the lens 102 compensating for the device motion. The processor 106 may also compare this quantity of shake to a motion threshold, and if the quantity of shake exceeds the motion threshold, display a message to the user that the amount of shake present exceeds the threshold. The motion thresholds may be calculated by the processor 106 using the shutter speed and focal length settings of the image capture device, or may be set using any one of a variety of other methods known by those of skill in the art, including manual setting by the user. Those of skill in the art will recognize that this motion threshold may actually be a plurality of thresholds with different information presented to the user depending on how many thresholds were exceeded. Also, those of skill in the art will recognize that the message presented to the user may vary widely within the scope of the present invention. In some example embodiments of the present invention, the message may be as simple as the illumination of a light emitting diode (LED) within the viewfinder to warn the user that the amount of shake has exceeded the threshold. In other example embodiments of the present invention, the amount and direction of the shake may be shown to the user on the display 116, and instructions on how to hold or brace the device to reduce or eliminate the shake may also be provided to the user. Still other example embodiments of the present invention may provide the user with an optional tutorial on camera shake where the user is instructed to brace the device while pressing the shutter in a training mode where no images are captured, with the device measuring the amount of shake and showing the user the improvement gained in reducing the amount of device shake.

In an example embodiment of the present invention, the shutter button 108 has two triggering thresholds S1, and S2. The S1 threshold is triggered when the shutter button 108 is pressed half way and is often used to lock focus and exposure before the shutter press is concluded at the S2 threshold where the image is captured. In an example embodiment of the present invention, the processor 106 uses correlation tracking to automatically track motion in the focus region while the shutter button 108 is at the S1 threshold. This tracking of motion in the focus region may be used by the processor 106 to generate one or more shake velocity vectors. An anticipated blur spot size may be calculated by the processor 106 from the shake velocity vectors and the shutter speed and focal length settings of the image capture device. This anticipated blur spot is the amount of blurring expected within the image captured given the present shake velocity vectors and the camera settings. The anticipated blur spot size is then compared against one or more blur spot thresholds to determine if excessive shaking is present. This resulting shake data is then sent to the display 116 for viewing by the user. Those of skill in the art will recognize that different embodiments of the present invention will use different thresholds since the amount of blur that is acceptable may be related to the pixel size of the image capture array 104, and other factors, such as a maximum allowed blur spot size set by the user. Once one or more of the thresholds is exceeded one or more of a variety of messages may be communicated to the user similar to those previously described. Also, those of skill in the art will recognize that in image capture devices including a gyro 114, the gyro 114 motion data may be used by the processor 106 to calculate shake velocity vectors which are then used to calculate anticipated blur spot sizes. Thus, instead of comparing motion data from the gyro 114 to motion thresholds, the gyro 114 may be used to generate blur spot size information which may then be compared to blur spot thresholds, all within the scope of the present invention.

Figure 2:
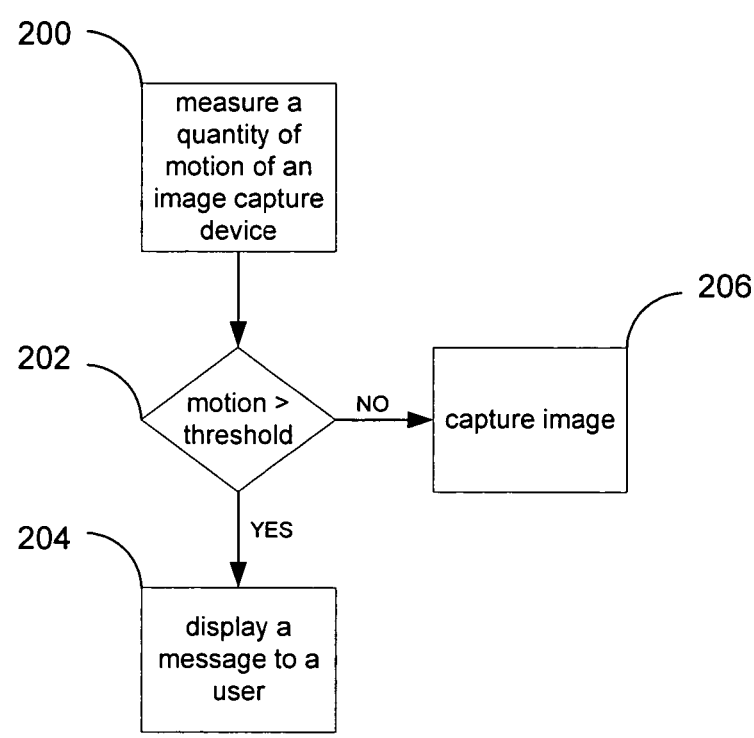
FIG. 2 is a flow chart of a method for metering shake within an electronic image capture device according to the present invention.

FIG. 2 is a flow chart of a method for metering shake within an electronic image capture device according to the present invention. In a step 200, measure a quantity of motion of an image capture device using one of the apparatus and techniques discussed above. In a decision step 202 compare the quantity of motion to at least one threshold as discussed above. If the quantity of motion (shake) exceeds at least one of the thresholds, in a step 204, display a message to a user. As discussed above, this message or shake warning may be any one of a variety of possible messages within the scope of the present invention. If the comparison of the motion to the thresholds takes place prior to image capture, and the quantity of motion does not exceed at least one of the thresholds, in a step 206, capture an image.

Figure 3:
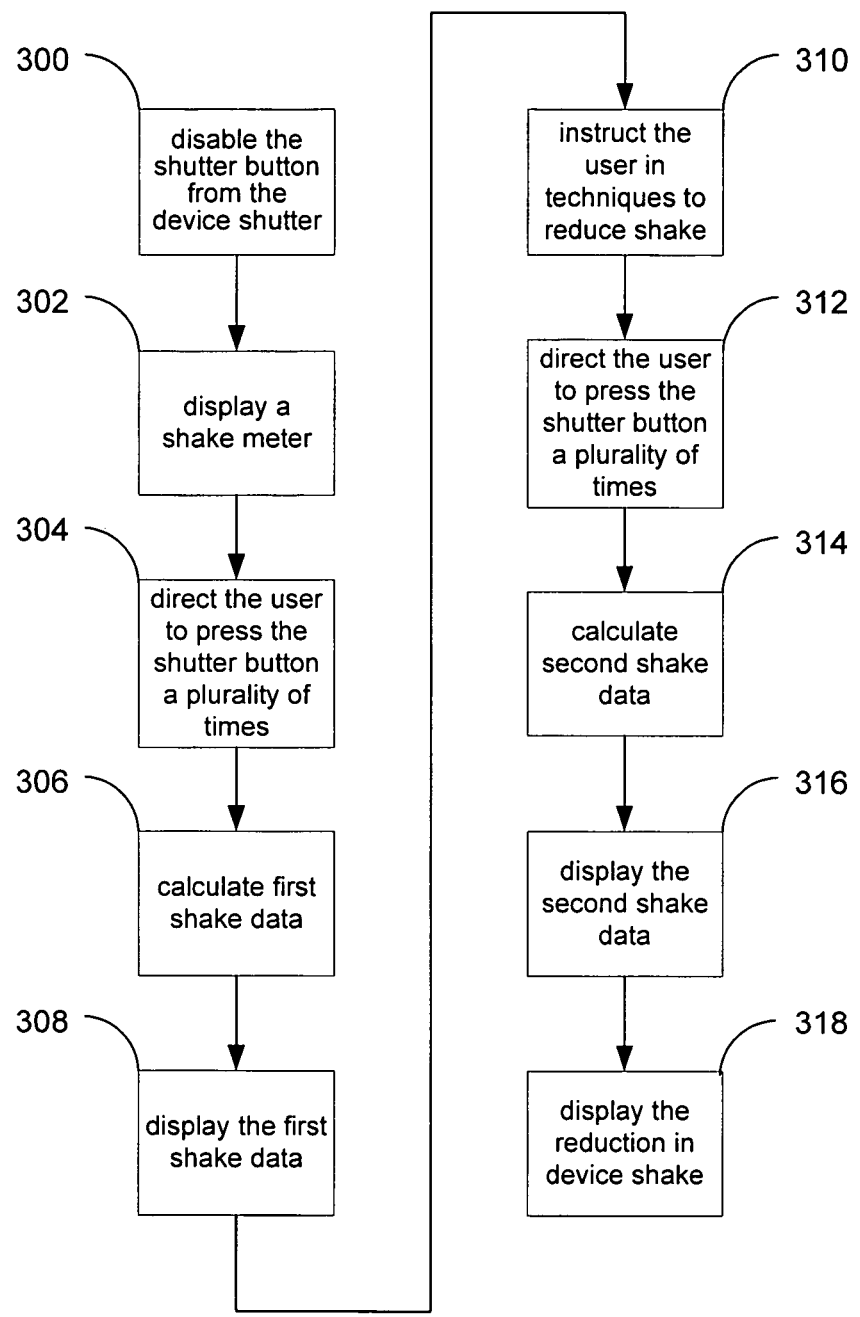
FIG. 3 is a flow chart of a method of instructing a user in techniques to reduce shake according to the present invention.

FIG. 3 is a flow chart of a method of instructing a user in techniques to reduce shake according to the present invention. In an example embodiment of the present invention, when excessive shake is detected, the user may be given the option to enter a training mode where the user may be tutored in the technique of reducing shake while using an image capture device. The steps in this method of training the user are illustrated in FIG. 3. In a step 300, disable the shutter button from the device shutter. In a step 302, display a shake meter. In a step 304, direct the user to press the shutter button a plurality of times. In a step 306, calculate first shake data during at least some of the presses of the shutter button. In a step 308, display to the user the resulting first shake data on the shake meter. In a step 310, instruct the user in techniques to reduce shake. In a step 312, direct the user to press the shutter button a plurality of times while incorporating the techniques to reduce shake. In a step 314, calculate second shake data during at least some of the presses of the shutter button. In a step 316, display to the user the resulting second shake data. In a step 318, display to the user the reduction in device shake gained by following the techniques to reduce shake.

The foregoing description of the present invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method comprising the steps of:
   a) measuring a quantity of motion of an image capture device;
   b) comparing the quantity of motion to a threshold; and
   c) displaying a message to a user when the quantity of motion exceeds the threshold, wherein said message to the user includes offering the user a training mode to learn how to hold the device steady without moving the device; and
   when the user invokes the training mode, then: disabling the shutter button from the device shutter; directing the user to press the shutter button a plurality of times; calculating first shake data during at least some of the presses of the shutter button; instructing the user in techniques to reduce shake; directing the user to press the shutter button a plurality of times while incorporating the techniques to reduce shake; calculating second shake data during at least some of the presses of the shutter button; and displaying to the user the reduction in device shake gained by following the techniques to reduce shake.

2. A method as recited in claim 1, further comprising the step of:
   d) creating at least one shake motion vector from the measured quantity of motion of the image capture device.

3. A method as recited in claim 2, further comprising the step of:
  e) calculating an anticipated blur spot size from the shake motion vectors and image capture device settings.

4. A method as recited in claim 3, wherein said threshold comprises one or more blur spot thresholds, and wherein said comparing the quantity of motion to a threshold step is performed by comparing the anticipated blur spot size to the one or more blur spot thresholds.

5. A method as recited in claim 1, wherein said displaying a message step is performed by an electronic display.

6. A method as recited in claim 1, wherein said measuring a quantity motion step is performed by an image stabilization gyro.

7. A method as recited in claim 6, wherein said threshold comprises one or more motion thresholds, and wherein said comparing the quantity of motion to a threshold step is performed by comparing the quantity of motion measured by the image stabilization gyro to the one or more motion thresholds.

8. A method as recited in claim 6, further comprising the step of:
  d) creating at least one shake motion vector from the measured quantity of motion of the image capture device provided by the gyro.

9. A method as recited in claim 8, further comprising the step of:
  e) calculating an anticipated blur spot size from the shake motion vectors and image capture device settings.

10. A method as recited in claim 9, wherein said threshold comprises one or more blur spot thresholds, and wherein said comparing the quantity of motion to a threshold step is performed by comparing the anticipated blur spot size to the one or more blur spot thresholds.

11. A method as recited in claim 1, wherein said message to the user includes information on how to reduce the motion of the image capture device.

12. An image capture device comprising:
  a body;
  an image capture array within said body, configured to output image data;
  a processor electrically coupled with said image capture array; and
  a display electrically coupled with said processor;
  wherein said processor is configured to input image data from said image capture array, calculate a shake motion vector from said image data, calculate an anticipated blur spot size from said shake motion vector and a shutter speed and focal length, compare said blur spot size to at least one blur spot threshold, and output shake data to said display; and wherein said display is configured to display a message to the user including offering the user a training mode to learn how to hold the device steady without moving the device, when said shake data exceeds a threshold value; and
  when the user invokes the training mode, then: disabling a shutter button from a device shutter; directing the user to press the shutter button a plurality of times; calculating first shake data during at least some of the presses of the shutter button; instructing the user in techniques to reduce shake; directing the user to press the shutter button a plurality of times while incorporating the techniques to reduce shake; calculating second shake data during at least some of the presses of the shutter button; and displaying to the user the reduction in device shake gained by following the techniques to reduce shake.

13. An image capture device as recited in claim 12, wherein said processor performs correlation tracking on image data from said image capture array when a first threshold is signaled by said shutter button, and calculates shake motion vectors using the correlation tracking.

14. An image capture device as recited in claim 12, wherein said shake data is calculated, and displayed prior to capture of an image.

15. An image capture device as recited in claim 12, wherein said shake data is calculated during capture of an image, and displayed after capture of an image.

16. An image capture device as recited in claim 12, wherein said display is also configured to provide information to the user on how to reduce the shake of the image capture device.

17. An image capture device as recited in claim 12, wherein said display is also configured to offer the user a training mode to learn how to hold the device steady.

18. An image capture device comprising:
  a body;
  a gyro within said body, configured to output motion data;
  a processor electrically coupled with said gyro; and
  a display electrically coupled with said processor; wherein said processor is configured to input motion data from said gyro, calculate a shake motion vector from said motion data, calculate an anticipated blur spot size from said shake motion vector and a shutter speed and focal length, compare said blur spot size to at least one blur spot threshold, and output shake data to said display; and
  wherein said display is configured to display a message to the user including offering the user a training mode to learn how to hold the device steady without moving the device, when said shake data exceeds a threshold value; and
  when the user invokes the training mode, then: disabling a shutter button from a device shutter; directing the user to press the shutter button a plurality of times; calculating first shake data during at least some of the presses of the shutter button; instructing the user in techniques to reduce shake; directing the user to press the shutter button a plurality of times while incorporating the techniques to reduce shake; calculating second shake data during at least some of the presses of the shutter button; and displaying to the user the reduction in device shake gained by following the techniques to reduce shake.

19. An image capture device as recited in claim 18, wherein said processor calculates said shake data when a first threshold is signaled by said shutter button.

20. An image capture device as recited in claim 18, wherein said shake data is calculated, and displayed prior to capture of an image.

21. An image capture device as recited in claim 18, wherein said shake data is calculated during capture of an image, and displayed after capture of an image.

22. An image capture device as recited in claim 18, wherein said display is also configured to provide information to the user on how to reduce the shake of the image capture device.

23. An image capture device comprising:
  a body;
  a gyro within said body, configured to output motion data;
  a processor electrically coupled with said gyro; and
  a display electrically coupled with said processor; wherein said processor is configured to input motion data from said gyro, compare said motion data to at least one motion threshold, and output shake data to said display;
  wherein said display is configured to display a message to the user including offering the user a training mode to learn how to hold the device steady without moving the device, when said shake data exceed a threshold value; and when the user invokes the training mode, then: disabling a shutter button from a device shutter; directing the user to press the shutter button a plurality of times; calculating first shake data during at least some of the presses of the shutter button; instructing the user in techniques to reduce shake; directing the user to press the shutter button a plurality of times while incorporating the techniques to reduce shake; calculating second shake data during at least some of the presses of the shutter button; and displaying to the user the reduction in device shake gained by following the techniques to reduce shake.

24. An image capture device as recited in claim 23, further comprising:
a shutter button electrically coupled to said image capture array,
wherein said shutter button is configured with an S1 threshold reached when said shutter button is depressed halfway, and an S2 threshold reached when said shutter button is completely depressed, and electronic signals are sent to said processor at each of said thresholds.

25. An image capture device as recited in claim 24, wherein said processor calculates said shake data when a first threshold is signaled by said shutter button.

26. An image capture device as recited in claim 23, wherein said shake data is calculated, and displayed prior to capture of an image.

27. An image capture device as recited in claim 23, wherein said shake data is calculated during capture of an image, and displayed after capture of an image.

28. An image capture device as recited in claim 23, wherein said display is also configured to provide information to the user on how to reduce the shake of the image capture device.

29. An image capture device comprising:
means for measuring motion of said image capture device, and generating motion data;
means for calculating shake motion vectors from said motion data;
means for calculating anticipated spot size data from said shake motion vectors and a shutter speed and a focal length;
means for comparing said spot size data to at least one spot size threshold, and generating shake data;
means for displaying a message to the user including offering the user a training mode to learn how to hold the device steady without moving the device, when said shake data exceeds a threshold value; and
when the user invokes the training mode, then: disabling a shutter button from a device shutter; directing the user to press the shutter button a plurality of times; calculating first shake data during at least some of the presses of the shutter button; instructing the user in techniques to reduce shake; directing the user to press the shutter button a plurality of times while incorporating the techniques to reduce shake; calculating second shake data during at least some of the presses of the shutter button; and displaying to the user the reduction in device shake gained by following the techniques to reduce shake.

30. An image capture device comprising:
means for measuring motion of said image capture device, and generating motion data;
means for comparing said motion data to at least one motion threshold, and generating shake data;
means for displaying a message to the user including offering the user a training mode to learn how to hold the device steady without moving the device, when said shake data exceeds a threshold value; and
when the user invokes the training mode, then: disabling a shutter button from a device shutter; directing the user to press the shutter button a plurality of times; calculating first shake data during at least some of the presses of the shutter button; instructing the user in techniques to reduce shake; directing the user to press the shutter button a plurality of times while incorporating the techniques to reduce shake; calculating second shake data during at least some of the presses of the shutter button; and displaying to the user the reduction in device shake gained by following the techniques to reduce shake.

31. A method comprising the steps of:
a) measuring a quantity of motion of an image capture device;
b) comparing the quantity of motion to a threshold; and
c) displaying a message to a user when the quantity of motion exceeds the threshold, wherein said message to the user includes offering the user a training mode to learn how to hold the device steady without moving the device, wherein the training mode includes the following steps:
1) disabling the shutter button from the device shutter;
2) displaying a shake meter;
3) directing the user to press the shutter button a plurality of times;
4) calculate first shake data during at least some of the presses of the shutter button;
5) displaying to the user the resulting first shake data on the shake meter;
6) instructing the user in techniques to reduce shake;
7) directing the user to press the shutter button a plurality of times while incorporating the techniques to reduce shake;
8) calculate second shake data during at least some of the presses of the shutter button;
9) displaying to the user the resulting second shake data; and
10) displaying to the user the reduction in device shake gained by following the techniques to reduce shake.

32. A method as recited in claim where the training mode further comprises the step of:
8) displaying a shake meter.

33. A method as recited in claim 32, where the training mode further comprises the steps of:
9) displaying to the user the resulting first shake data on the shake meter; and
10) displaying to the user the resulting second shake data.

* * * * *

UNITED STATES PATENT AND TRADEMARK OFFICE
CERTIFICATE OF CORRECTION

PATENT NO. : 8,537,224 B2  
APPLICATION NO. : 11/047958  
DATED : September 17, 2013  
INVENTOR(S) : Sobol Page 1 of 1

It is certified that error appears in the above-identified patent and that said Letters Patent is hereby corrected as shown below:

On the Title page, in Item [54] and in the Specification, column 1, line 2, Title, delete "METTER" and insert -- METER --, therefor.

In the Claims

In column 5, line 5, in Claim 4, delete "threshold." and insert -- threshold --, therefor.

In column 8, line 50, in Claim 32, delete "claim" and insert -- claim 1, --, therefor.

Signed and Sealed this  
Seventeenth Day of December, 2013

Margaret A. Focarino  
*Commissioner for Patents of the United States Patent and Trademark Office*